United States Patent Office 3,308,068
Patented Mar. 7, 1967

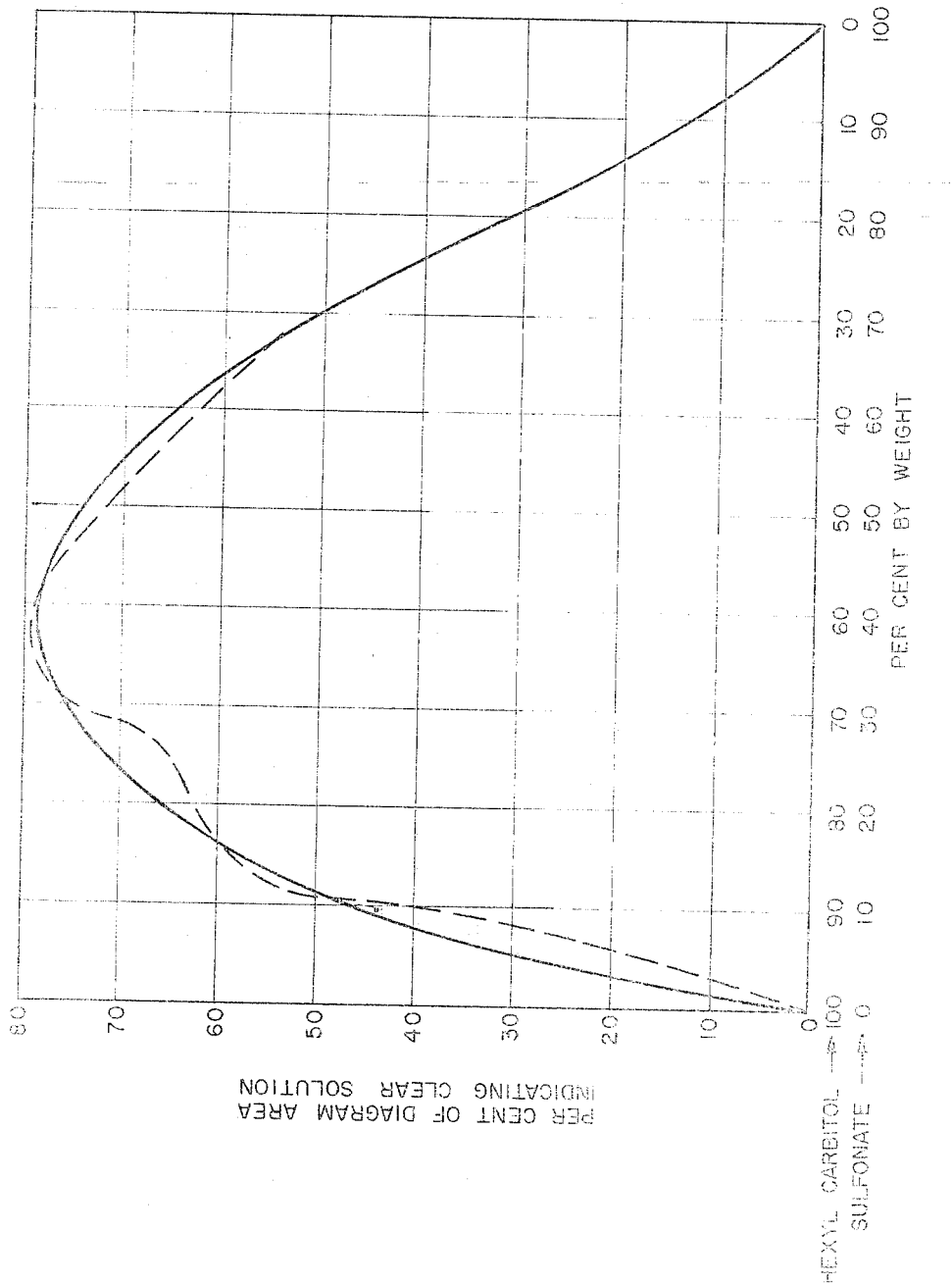

3,308,068
DETERGENT COMPOSITION
Loyd W. Jones, Tulsa, Okla., assignor to Pan American Petroleum Corporation, Tulsa, Okla., a corporation of Delaware
Filed Apr. 25, 1963, Ser. No. 275,545
5 Claims. (Cl. 252—161)

This invention relates to a novel, highly water- and oil-soluble, surface-active composition prepared from substantially water-insoluble components. More particularly, it is concerned with a surface-active composition that can be added to oil or water, after which water or oil is added thereto to produce a clear solution without any indication of a phase change.

The compositions of my invention are prepared from hexyl Carbitol (diethylene glycol monohexylether) and a hydrocarbon metal sulfonate. These two materials are mixed, for example, at room temperature (75° F.) over a wide range of proportions. The amount of oil or water that can be added to a water or oil solution of the compositions of my invention without producing a phase change in the mixture also varies over a wide range. In water these compositions exhibit foaming and wetting properties and when dissolved in oil, function as good solubilizers and emulsifiers.

Figure 1:
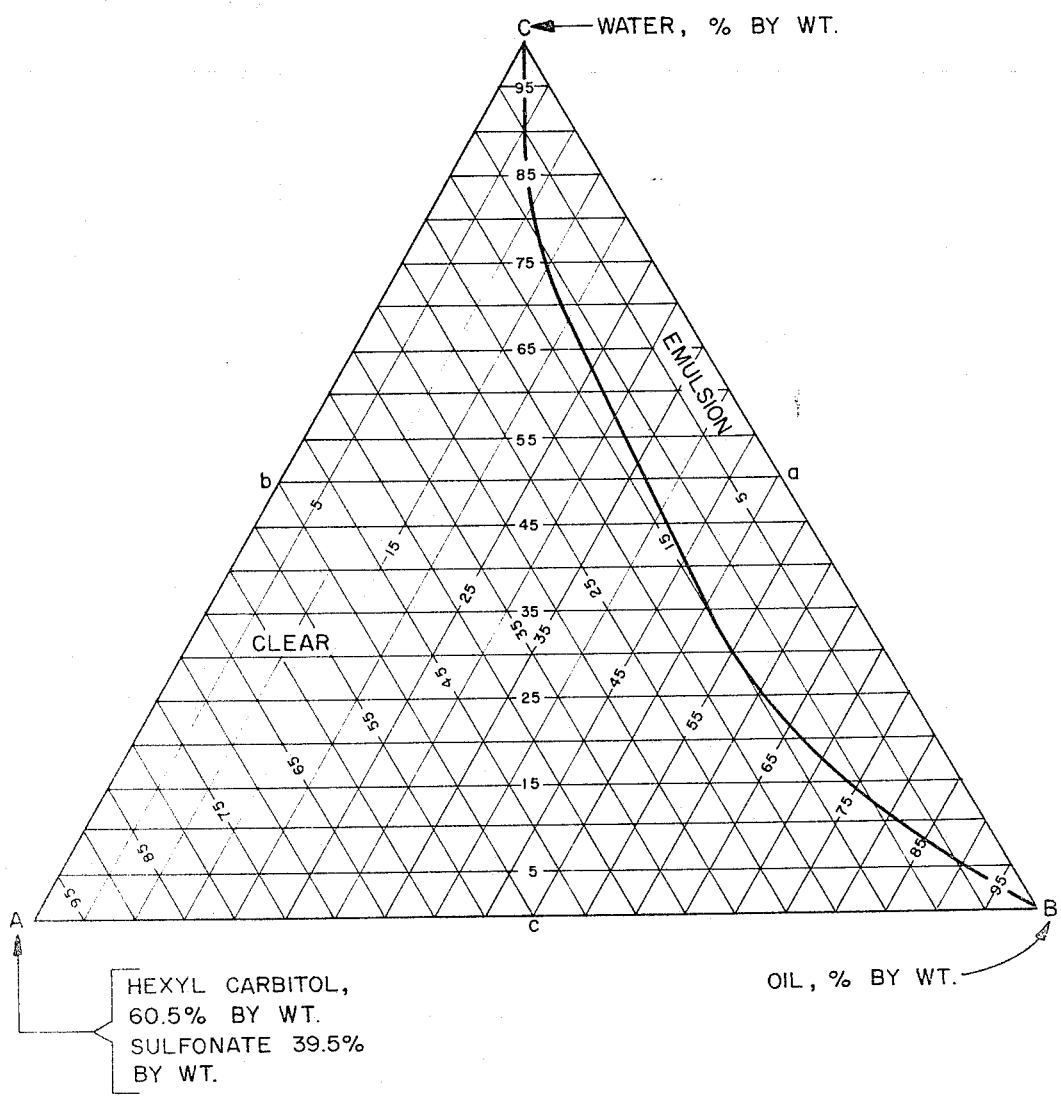

One of the surprising features of my invention is that the hydrocarbon sulfonates are soluble in water to the extent of only about 1 percent, and the solubility of hexyl Carbitol in water is about 1.7 percent. Yet, when these two substances are combined, the resulting composition is highly soluble both in water and oil. The properties of such compositions, however, are influenced rather markedly by the proportion of Carbitol to sulfonate employed, as can be seen by reference to FIGURE 1. The additive designated at (A) was composed of 60.5 weight percent hexyl Carbitol and 39.5 weight percent of a sodium hydrocarbon sulfonate derived by treatment of lube stock, or similar mineral oils first with sulfuric acid and then neutralized with caustic. Such sulfonates are frequently referred to as petroleum mahogany sulfonates. The commercial sulfonate product which was blended with the hexyl Carbitol to produce the above-mentioned composition contained the following components, all percentages being by weight: 53.6 percent sulfonate, 38.4 percent mineral oil, 2 percent inorganic salt, and 6.3 percent water. The average molecular weight of the sulfonate portion was 477 and the composition used weighed 8.4 pounds per gallon. To the blend of hexyl Carbitol and petroleum sulfonate was added additional oil in the form of a $C_{10}$ to $C_{12}$ carbon chain length aliphatic hydrocarbon. The total oil in each resulting mixture included the oil present in the aforesaid petroleum sulfonate product plus the $C_{10}$–$C_{12}$ oil which was added. Points representing the composition of these oil solutions lie substantially along axis A–B of FIGURE 1, with point B representing 100 percent oil. To a number of the oil solutions water, in incremental quantities, was added. The water component of the final blends was the total of the water present in the petroleum sulfonate plus the amount added. Upon addition of water, the points in FIGURE 1 representing the composition of the final blends advanced from axis A–B toward point C, representing 100 percent water. The condition of each final mixture, whether clear and consisting of a single phase or cloudy due to phase separation was noted and plotted in FIGURE 1. Points representing the first appearance of phase separation in each mixture were connected to give Curve A. FIGURE 1 is thus a solubility diagram for the above-mentioned system.

To the left of the phase change boundary line (Curve A), indicating the composition at which a phase change occurs, all compositions made up of components (A), (B), and (C) are clear. For example, a line drawn from the point defined by 55 percent additive and 45 percent oil on axis A–B gives a homogeneous solution regardless of the quantity of water subsequently added. Any composition defining a point falling on or to the right of Curve A produced a hazy or cloudy emulsion.

Figure 2:
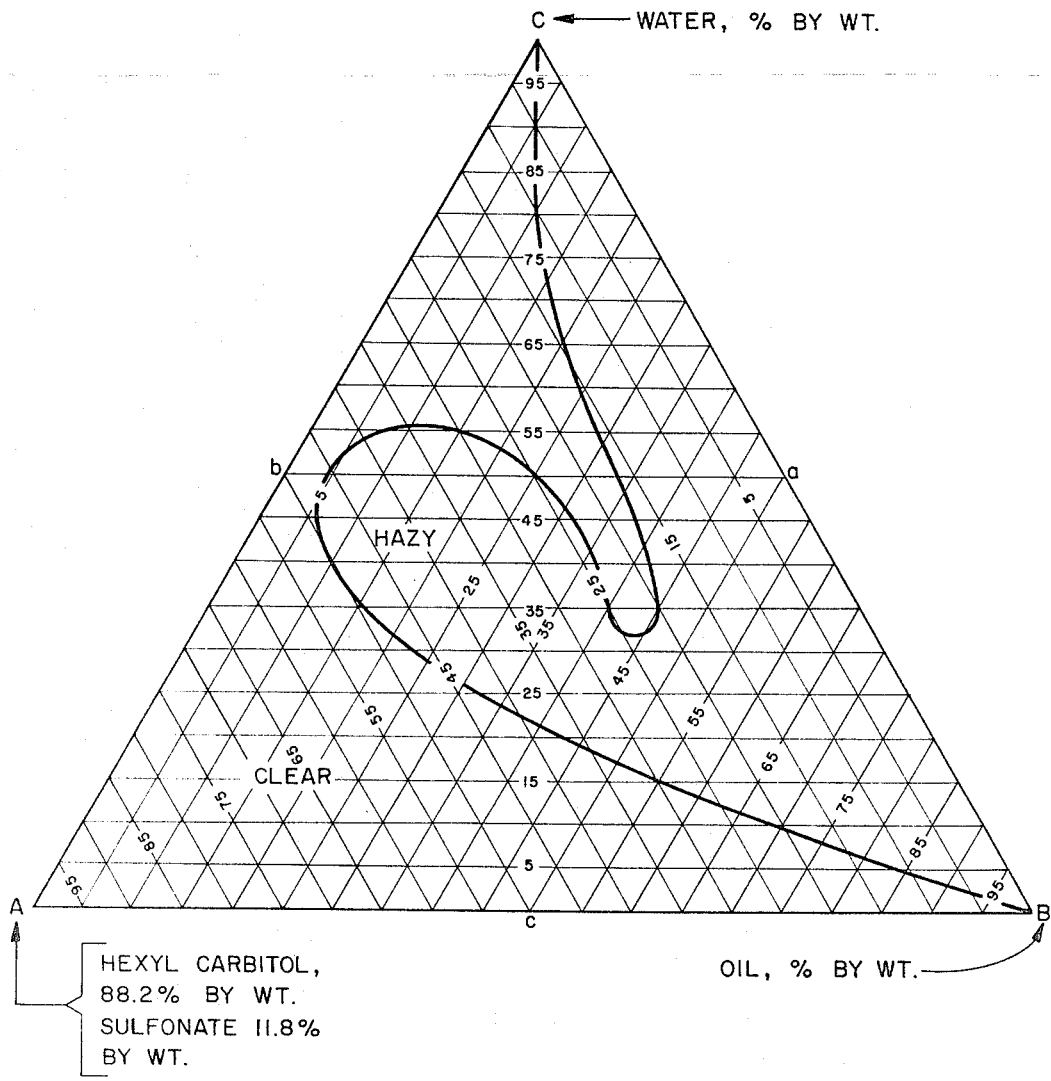
Figure 3:
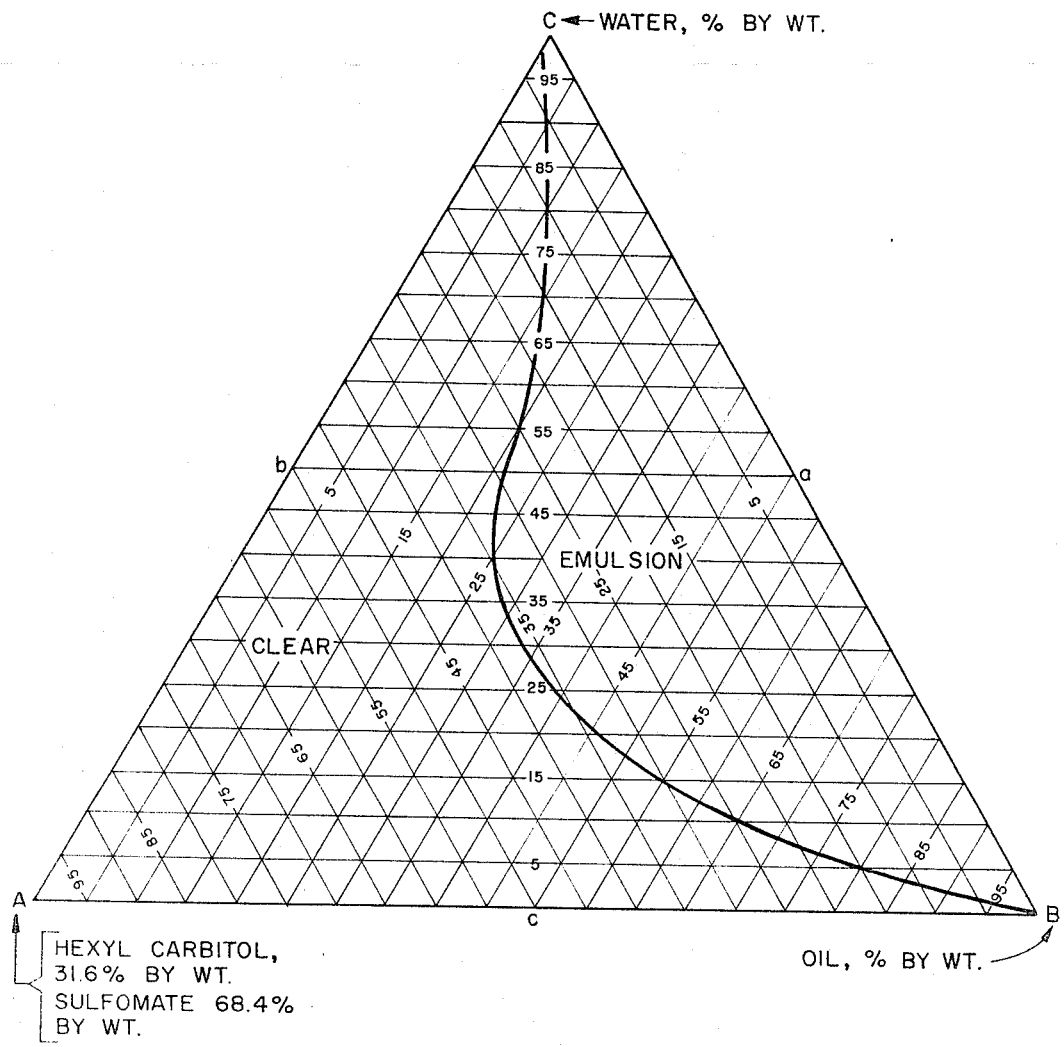

The characteristics of the three-component system, i.e., mixtures of substances designated A, B and C, referred to in FIGURE 1, vary with the composition of the additive (A). By increasing the amount of sulfonate, for example, in the additive from, say 6 percent to about 40 percent, I am able to increase very substantially the amount of clear area in the solubility diagrams. If the concentration of sulfonate is increased beyond 40 weight percent, the amount of clear area diminishes. FIGURES 2 and 3 illustrate this point very clearly. Thus, in FIGURE 2, it is seen that the additive is composed of 88.2 percent hexyl Carbitol and 11.8 percent sulfonate—a ratio of about 9:1, with the clear portion of the solubility diagram amounting to not more than about one half of the diagram area. However, as this ratio is decreased, for example, to about 3:2, as shown in FIGURE 1, the clear area approaches a maximum. Upon a further decrease of the hexyl Carbitol-sulfonate ratio, to about 3:7, the maximum clear area is passed and the hazy or cloudy portion increases, as illustrated in FIGURE 3.

Variations in the ratio of components of additive A and their influence on the formation of solutions that can be diluted with substantial amounts of oil or water without causing a phase change can be seen from the plot in FIGURE 4. The curve is based on data using additives having the following composition: 94.3 percent hexyl Carbitol and 5.7 percent hydrocarbon sulfonate; 88.2 percent hexyl Carbitol and 11.8 percent hydrocarbon sulfonate; 73.5 percent hexyl Carbitol and 26.5 percent hydrocarbon sulfonate; 69.5 percent hexyl Carbitol and 30.5 percent hydrocarbon sulfonate; 60.5 percent hexyl Carbitol and 39.5 percent hydrocarbon sulfonate; 55.2 percent hexyl Carbitol and 44.8 percent hydrocarbon sulfonate, and 31.6 percent hexyl Carbitol and 68.4 percent hydrocarbon sulfonate. Each additive was used to prepare a triangular diagram of the type shown in FIGURES 1, 2 and 3. After each of these diagrams had been prepared, the ratio of clear area on the left side of the phase change boundary curve to the hazy or cloudy area on the opposite side was determined. Each of the ratios obtained from the seven separate diagrams, based on the seven separate additive compositions listed, was then used to plot the curve in FIGURE 4. The shaded area below the curve represents the range of additive component ratios that produced a maximum of clear solution area in the solubility diagrams.

FIGURE 4 shows that in order to produce a system which will result in at least about 50 percent of the solubility diagram area defining clear solutions, the ratio of hexyl Carbitol to hydrocarbon sulfonate should range from about 9:1 to about 3:7. The largest clear areas are obtained with hexyl Carbitol-hydrocarbon sulfonate ratios of from about 7:3 to 1:1. In other words, with these ratios of hexyl Carbitol to hydrocarbon sulfate the maximum amounts of both water and oil can be tolerated in the solutions without a phase change.

One of the outstanding features of my invention resides in the fact that it is now possible to render the normally water-insoluble hydrocarbon sulfonates highly water-soluble. These materials are well known for their ability to function as corrosion inhibitors, emulsifiers and detergents. However, the petroleum sulfonates as well as the synthetic high molecular weight alkyl aryl sulfonates are limited to some extent in their usefulness, owing to their normally low solubility in water. Because of low solubility, concentrated water solutions for use as liquid detergents, corrosion inhibitors, etc., are difficult to prepare. Blends of hexyl Carbitol with the synthetic sulfonates exhibit water-solubility similar to that shown by mixtures of hexyl Carbitol and petroleum sulfonates. Either the synthetic sulfonates or the low-cost petroleum sulfonates can be used in accordance with my invention to manufacture cleaning and wetting preparations. In this connection, the ability of the compositions of my invention to reduce oil-water interfacial tension as compared to hexyl Carbitol or a petroleum sodium sulfonate, alone, is shown in the table below. These measurements were taken by dissolving the additive in $C_{10}$-$C_{12}$ hydrocarbon, placing this solution in contact with water containing 5 percent sodium chloride, and measuring the tension at the interface between the two layers with a Du Nouy ring tensiometer.

TABLE I

| Additive Composition Percent by Weight | | Concentration of Additive in $C_{10}$-$C_{12}$ oil, Percent by weight | Interfacial Tension Additive in $C_{10}$-$C_{12}$ Hydrocarbon Solution vs. 5% NaCl Solution, —dynes/cm. |
|---|---|---|---|
| Hexyl Carbitol | Sulfonate | | |
| 100 | 0 | 1.00 | 13.0 |
| 0 | 100 | 1.08 | 6.2 |
| 65 | 35 | 0.77 | 1.4 |
| 65 | 35 | 1.54 | 1.2 |
| 65 | 35 | 3.08 | 0.9 |

It is obvious that the combination of the constituents of my invention produces a synergistic lowering of interfacial tension. The same effects are observable on surface tension of aqueous solutions against air.

Low concentrations, e.g., 5 percent or less, of these additives produce better, more stable emulsions of oils, aromatic solvents, and the like than do the hydrocarbon sulfonates by themselves. The marked ability of such compositions to produce homogeneous solutions containing high concentrations of both oil and water renders them useful in the preparation of a wide range of specialty items such as wash and wax products for floors and automobiles, low cost nonflammable hydraulic fluids, cutting oils, and drilling fluids. Many products utilizing petroleum sulfonates such as crude oil demulsifiers may be benefited by the unique properties of the combination additive.

A further and important use of these compositions based on their pronounced ability to reduce interfacial tension involves their use as an additive to flooding water in secondary oil recovery projects. The composition can be placed in the formation as a spearhead miscible with either oil or water. Such compositions are suited for this purpose since they can be graded smoothly and without phase change from all oil to all water.

A composition employing one of the aforesaid additives suitable for use as a corrosion inhibitor is composed of the following:

TABLE II

| Component: | Weight, percent |
|---|---|
| Petroleum sulfonate (100% active sulfonate with molecular weight in excess of 450) | 21 |
| Hexyl Carbitol | 29 |
| Light mineral oil | 50 |

Water is added slowly to the above mixture until the final composition contains about 50 percent water by weight. Added to radiators, cooling systems, or other water systems in concentrations of 1 ounce to 1–10 gallons of water, this mixture gives good protection against oxidation corrosion. Other water-soluble components such as sodium nitrite, sodium mercapto-benzothiazol, alkali metal, fatty acid soaps, and the like can be added to enhance rust-inhibiting powers. Even some water-insoluble materials such as lecithin are solubilized by the additive of this invention and these may be formulated into the inhibitor composition.

An additional unexpected feature of my invention is that while both petroleum sulfonates and the synthetic sulfonates, such as the alkyl aryl sulfonates, are capable of forming with hexyl Carbitol the compositions contemplated herein, compounds closely related to hexyl Carbitol, such as diethylene glycol dibutylether (dibutyl Carbitol), 2-hexoxyethanol (hexyl Cellosolve) and 2-butoxyethanol (butyl Cellosolve) do not solubilize the hydrocarbon sulfonate into water. Thus, while the sulfonate portion of my novel composition is not indicated to be critical, the hexyl Carbitol component apparently is. Only compounds of essentially the same structure as the hexyl Carbitol, viz. ethylene oxide adducts of hexyl alcohol, appear to be suitable alternates.

The sulfonates employed in preparing the compositions of my invention may be selected from a wide range of materials including the petroleum sulfonates as well as the synthetic sulfonates. These compositions are prepared by first reacting a mineral oil or an alkyl aryl hydrocarbon of the type commonly used in the manufacture of detergents, with sulfuric acid, sulfur trioxide or mixtures and neutralizing the resulting sulfonic acid with the appropriate alkali or alkaline earth metal compound. In this regard, it is to be understood that the expression "alkaline earth metal" includes the $NH_4$ radical.

The term "sulfuric acid" as used in the present claims is intended to include sulfur trioxide as well as mixtures thereof with sulfuric acid.

I claim:
1. A substantially clear aqueous solution to which an infinite amount of water can be added without a phase change consisting essentially of diethylene-glycol mono-hexyl ether and a petroleum alkali metal sulfonate, said mono-hexyl ether and sulfonate being present in a weight ratio ranging from about 9:1 to about 3:7, and a mineral oil, the percentage of said mono-hexyl ether, said sulfonate, water, and said oil being defined by a point lying to the left of curve in FIGURES 1, 2 and 3.

2. The composition of claim 1 in which the ratio of diethylene-glycol mono-hexyl ether to sulfonate ranges from about 7:3 to 1:1.

3. A surface-active composition to which an infinite amount of water can be added without a phase change consisting essentially of water, a mineral oil, and an effective amount of diethylene-glycol mono-hexyl ether and a petroleum mahogany alkali metal sulfonate, in which the weight ratio of said mono-hexyl ether to sulfonate ranges from about 3:7 to about 9:1.

4. A surface-active composition to which an infinite amount of water can be added without a phase change consisting essentially of water, mineral oil, and an effective amount of diethylene-glycol mono-hexyl ether, and a petroleum alkali metal sulfonate, in which the weight ratio of said mono-hexyl ether to sulfonate ranges from about 3:7 to about 9:1, the composition of the resulting solution defining a point falling to the left of the phase boundary line of any ternary diagram wherein the reference points of said diagram consist of water, oil, and a mixture of said mono-hexyl ether and said sulfonate coming within the aforesaid range.

5. A surface-active composition to which an infinite amount of water can be added without a phase change consisting essentially of water, mineral oil, and an effective amount of diethylene-glycol mono-hexyl ether and a petroleum hydrocarbon sodium sulfonate, in which the weight ratio of said mono-hexyl ether to sulfonate ranges from about 3:7 to about 9:1, the composition of the resulting solution defining a point falling to the left of the phase boundary line of the ternary diagrams shown in FIGURES 1, 2, and 3.

References Cited by the Examiner

UNITED STATES PATENTS

| | | | |
|---|---|---|---|
| 2,355,591 | 8/1944 | Flaxman | 252—161 X |
| 2,637,703 | 5/1953 | Dixon et al. | 252—395 |

OTHER REFERENCES

Synthetic Organic Chemicals, "Physical Properties" (1961 edition), Union Carbide Chemicals Company, New York, (page 10 relied on).

LEON D. ROSDOL, *Primary Examiner.*

JULIUS GREENWALD, *Examiner.*

J. T. FEDIGAN, *Assistant Examiner.*